Patented Oct. 31, 1939

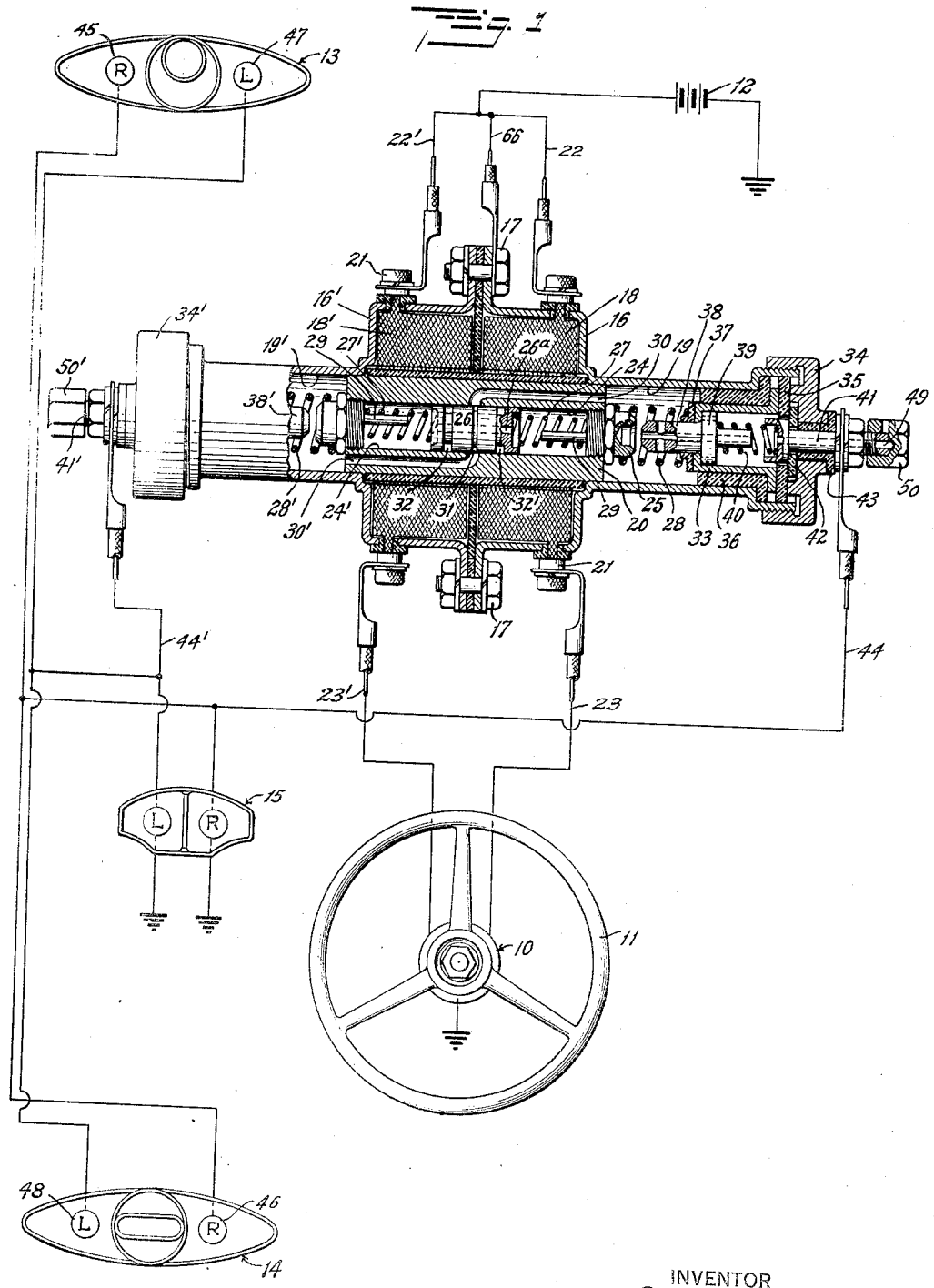

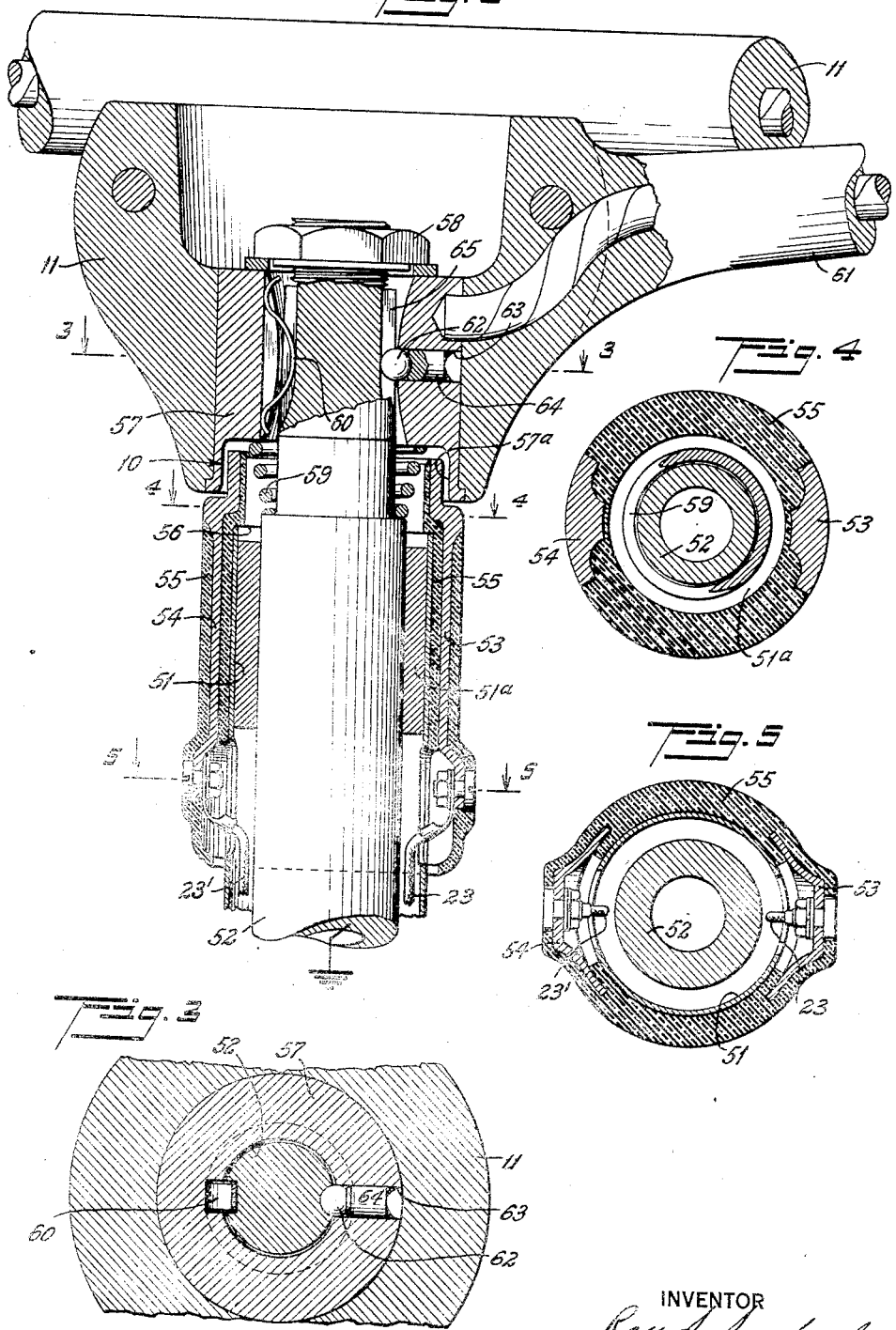

2,177,748

UNITED STATES PATENT OFFICE 2,177,748

CONTROL MEANS

Roy S. Sanford, New York, N. Y.

Application September 17, 1934, Serial No. 744,353

8 Claims. (Cl. 200—97)

This invention relates to electrical devices and more particularly to electrically operated directional signal apparatus adapted for use on automotive vehicles.

One of the objects of the present invention is to provide a novel directional signal system for vehicles whereby a signal may be energized by manual means and continue in operation for a predetermined time after said manual means are released.

Another object of the invention is to provide novel switch means for controlling the flow of current in an electric circuit in a predetermined manner.

Another object is to provide novel switch means in combination with the steering mechanism of a vehicle for controlling a system of directional signals.

A further object is to provide a novel method of operating a directional signal system for vehicles.

The above and further objects and novel features of this invention will appear more fully in the following detailed description taken in connection with the accompanying drawings. It is to be expressly understood, however, that the drawings are for the purpose of illustration only and are not designed as a definition of the limits of the invention, reference being had primarily to the appended claims for this purpose.

In the drawings, wherein like reference characters refer to like parts throughout the several views:

Fig. 1 is a diagrammatic view of a directional signal system embodying this invention, one form of novel relay switch being shown in elevation, partly in section and with parts broken away;

Fig. 2 is a side elevation, partly in section and with parts broken away, illustrating one form of novel switch mechanism constituting a part of the present invention;

Fig. 3 is a section taken on line 3—3 of Fig. 2;

Fig. 4 is a section taken on line 4—4 of Fig. 2; and

Fig. 5 is a section taken on line 5—5 of Fig. 2.

In the embodiment of the invention shown in Fig. 1, the novel directional signal system comprises a novel manually operable switch 10 to be hereinafter described in detail, in combination with steering wheel 11, a battery 12, front and rear signal light assemblies 13 and 14 respectively, and a pilot light assembly 15.

Preferably, the system also includes novel means whereby a turn signal may be energized at a time prior to the execution of a turn and remain energized for a predetermined interval without further effort on the part of the operator, thus rendering it possible to forewarn other traffic of an intended turn while assuring the de-energization of the signal after making the turn without in any way detracting from the operator's control of the vehicle. In the form shown, such means are constituted by a novel relay switch mechanism connected in circuit between switch 10 and signal light assemblies 13, 14, the same comprising a pair of housing or casing members 16 and 16' secured to one another by means of bolts 17. In the adjacent, enlarged ends of said casings are mounted a pair of coils 18 and 18' having hollow centers equal in diameter to the reduced cylindrical portions 19, 19' of casing 16, 16'. The cylindrical portions 19, 19' are preferably filled with a suitable liquid such as oil. Slidably mounted within solenoids 18, 18' is an armature or plunger 20 which also extends into and engages the inner walls of cylinders 19, 19'. Suitable terminals 21 are provided for coils 18, 18' whereby the same are connected in independent circuits with battery 12 and switch 10 by means of leads 22, 22' and 23, 23', coil 18 controlling the right and coil 18' the left turn signals.

Core 20 is provided with a central bore 24 which is closed at each end by threaded plugs 25 to form a closed cylinder which is filled with a suitable liquid. A floating plunger or piston valve 26 is adapted to reciprocate within said bore, the same being normally held in a central position therein by suitable resilient means such as springs 27, 27' interposed between plugs 25 and the opposite ends of valve plunger 26. Core 20 is in turn held in a central position in casing 16, 16' by a pair of springs 28, 28'. The reciprocating movement of piston 26 in core 20 is limited by stops formed integrally with plugs 25, said stops in the form shown being formed by inwardly extending and eccentrically disposed pins 29. A central longitudinal passage 26a is provided in piston 26 to provide for the flow therethrough of the oil in cylinder 24, 24'.

A pair of diametrically disposed passages 30 and 30' are formed in the walls of core 20, the same extending longitudinally from opposite ends of said core and turning inwardly to communicate with valve cylinder 24 at the center thereof. The flow of liquid through passage 30, 30' is controlled by piston valve 26 which is provided with a shallow, centrally placed, annular groove 31 and a pair of similar but larger grooves 32 and 32' adjacent the ends thereof.

In the outer end of cylinder 19 there is provided a flanged, cup-shaped member 33 adapted to be held in place by a cap 34 threaded onto said cylinder, member 33 being insulated from said cap and the casing by means of a washer 35 and a flanged sleeve 36. One end of spring 28 rests against the inner end of cylinder 33, the latter being insulated from said spring by a washer 37 which is also adapted to position the spring. A plunger 38, constituting a movable contact member, is slidably mounted in cylinder 33 and extends inwardly into cylinder 19, the inward movement of plunger 38 being limited by the engagement of a flange 39 thereon with the end wall of cylinder 33. A spring 40 is provided for normally holding said contact plunger in the position shown in Fig. 1. A longitudinal passage through the center of plunger 38 and a pair of radial passages provides means of communication between cylinders 33 and 19.

The outer end of spring 40 seats against the inner end of a terminal rod 41, the same constituting an electrical connection between said terminal and contact plunger 38. Terminal post 41 is supported in a central opening through cap 34, said post being insulated therefrom by a washer 42 and a suitable bushing 43. Terminal 41 is electrically connected by means of lead 44 to both the front and rear right turn signal lamps 45 and 46. The left-hand end of the relay switch assembly is identical with the right-hand end thereof described above, except that the terminal post 41' is connected by lead 44' to the left turn signal lamps 47 and 48. Each of the lamps is provided with a ground connection not shown in the drawings to complete the circuit through battery 12, one terminal of which is also connected to ground.

Preferably, terminal post 41 has a passage 49 therein through which a suitable liquid, such as oil or glycerin, may be injected into the casing, a nut 50 being provided on the outer end of said post to seal said passage. To avoid air bubbles within the casing, nuts 50 and 50' may be removed, whereupon the liquid may be pumped through the casing. Nut 50' is then replaced and the casing turned on its end, as nut 50 is threaded in place, any air therein escaping through a radial passage therein, the conical outer end of member 41 fitting into the conical seat in nut 50 to eliminate an air pocket.

As heretofore pointed out, the signal system provided by this invention also includes novel switch means for the manual energization of the signals through the relay switch above described, whereby said signals will remain in operation for a predetermined interval after release of said manual means. Such means, as shown, are so constructed, in combination with the steering wheel of the vehicle on which the system is installed, that the driver may at will energize either set of signals irrespective of the position of the steering wheel and without removing either hand therefrom, the driver being free to give his undivided attention to the control of the vehicle, and not being under the necessity of reaching for a switch on the dash or steering column.

In the form shown in Fig. 2, the fixed contacts of switch 10 are mounted on a housing 51 surrounding steering column 52, and spaced therefrom as by means of a sleeve 51a. Said fixed contacts are constituted by a pair of metallic strips 53 and 54 extending longitudinally of steering column 52 on opposite sides thereof and are preferably moulded into the walls of a cylindrical member 55 made of insulating material such as Bakelite, which member is supported on housing 51 by means of an internal shoulder 56 which engages the upper end of said housing. The upper, outside edges of contacts 53 and 54 are not insulated, and the lower ends thereof are connected to solenoid coils 18 and 18' respectively by means of leads 23 and 23'.

The movable contact member of switch 10 is constituted by the annular metallic hub portion 57 of steering wheel 11, which latter is mounted on the upper reduced end portion of steering column 52, being held thereon by a nut 58. The central opening in hub 57 is hyperbolic or similar thereto in cross-section to permit of a lateral tilting movement of wheel 11, the smallest diameter being only slightly greater than that of the reduced portion of the steering column. The extreme lower portion of hub 57 is hollowed out to a diameter somewhat greater than the outside diameter of the upper end of member 55, which extends into said hub, and the lower annular end 57a of said hub is adapted to be tilted into engagement with contact 53 or contact 54.

Wheel 11 is normally held in a horizontal position relative to column 52 and hub 57 is held out of engagement with contacts 53 and 54 by means of a coil spring 59 interposed between hub 57 and a shoulder formed on steering column 52. A leaf spring 60, inserted in longitudinal slots in hub 57 and column 52, absorbs any undesirable lateral movement or rattling of wheel 11.

Turning movement of wheel 11 may be transmitted to hub 57 by any suitable means, such as suitably covered metal spokes 61 operatively connected to said wheel in the usual manner. Such movement is in turn transmitted to column 52 for turning the front wheels of the vehicle through the medium of a ball 62. The latter is maintained in a radial opening 63 in hub 57 by a plug 64, a portion of said ball extending into a groove 65 having a semicircular cross-section in shaft 52.

In operation, the driver, when approaching a turn to the right, for example, need only tilt the steering wheel to the right against the pressure of spring 59, thus bringing the lower edge 57a of hub 57 into contact with the exposed upper end of contact strip 53. A circuit is thereby closed from battery 12 through lead 22, coil 18, lead 23, strip 53, hub 57, shaft 52 and ground. The electromagnetic forces set up by the energization of solenoid 18 tend to move plunger 20 and valve 26, as viewed in Fig. 1, to the right. The movement of plunger 20 is at first resisted by spring 28 and the fluid in cylinder 19, the only passage for said fluid to permit such movement being via restricted groove 31 on valve 26. Said valve, being resisted only by spring 27, quickly moves to the right against stop 29, bringing large groove 32 into register with passages 30 and 30' to permit a relatively free flow of liquid from cylinder 19 to cylinder 19'. Plunger 20 now moves more rapidly to the right, together with valve 26, into engagement with contact plunger 38, the latter being moved against the pressure of spring 40 until the outer end thereof contacts terminal post 41, the above action taking place almost instantaneously upon the contacting of hub 57 with strip 53.

The engagement of plungers 20, 25 and 38 closes a second circuit from battery 12 through lead 66, casing 16, plungers 20 and 38, spring 40, post 41, lead 44, right turn signal lamps 45 and 46 and ground. As soon as the driver releases the pressure on the right-hand side of wheel 11 and the contact at 53, 57 is broken, current ceases to flow in coil 18, whereupon valve 26 is immediately returned by spring 27 to a central position in chamber 24 again bringing restricted groove 31 into register with passages 30 and 30′, thus restricting the flow of fluid from cylinder 19′ to cylinder 19. Plungers 20 and 38 are thus restrained to move slowly to the left toward neutral position under the action of springs 28 and 40, the rate depending upon the size of groove 31. The circuit through the signal lamps is thus maintained until movement of contact 38 is arrested by flange 39 encountering the end of cylinder 33 and plunger 20 is moved out of engagement therewith by spring 28. Due to the arrangement of the springs, and the passages in member 38, the latter moves out of engagement with member 41 before plunger 20 moves out of engagement with member 38. Until the latter movement occurs, the circuit is maintained by spring 40. The signals will thus be energized upon the tilting of the steering wheel and remain in operation for a predetermined interval after contact at the steering wheel is broken, the interval being determined by the size of groove 31 in valve 26 and the viscosity of the fluid employed.

When the driver wishes to signify his intention to turn left, he need only press down on the left side of wheel 11, thereby closing a circuit through coil 18′. The action of the relay switch is the same as above described, except that the parts move to the left instead of to the right. The pilot lights 15 indicate the condition of operation of the right and left hand circuits.

There is thus provided a novel directional signal system for automotive vehicles embodying novel manual and automatic switch means, whereby a signal may be energized to indicate an intention on the part of the driver to make a turn at any desired interval prior to the actual turning movement, said signal being automatically de-energized after a predetermined interval. There is also provided novel switch means in combination with the steering mechanism of a vehicle whereby an electric circuit may be closed without in any way disturbing the driver's grip on the steering wheel. Novel automatic, fluid controlled relay switch means are also provided for determining the interval of operation of said signals after release of the initiating switch. Mentally, the driver is thus concerned only with initiating the signal whenever he desires to make a turn, and physically, he need not for a single instant divert his efforts from the normal control of the vehicle.

Although only one embodiment of this invention has been illustrated and described, it is to be expressly understood that the same is not limited thereto, but that various changes may be made without departing from the spirit of the invention. For example, a gaseous fluid as well as a liquid may be employed in the novel relay unit for controlling the speed of movement of the parts. Other types of electrical relays may be employed if desired, and the relay of the present invention may be used in other environments. The steering wheel switch may be employed to control other accessories, such as a horn, etc. Various changes may also be made in the design and arrangement of parts illustrated, as will now be apparent to those skilled in the art. Reference will be had primarily to the appended claims for a definition of the limits of the invention.

What is claimed is:

1. In apparatus of the class described, a casing, a liquid confined therein, a hollow plunger in said casing having a liquid passage therethrough, resilient means for yieldingly holding said plunger against movement in either direction in said casing, a piston valve in said plunger for controlling liquid flow through said passage, resilient means for yieldingly holding said valve in position to restrict said flow, and electromagnetic means for moving said plunger against the efforts of said first-named resilient means and for moving said valve relative to the plunger to permit increased fluid flow through said passage.

2. In apparatus of the class described, a casing, a fluid therein, a plunger operable in said casing and having a fluid passage therethrough, a movable contact member in said casing, resilient means for normally holding said plunger and member in predetermined positions, means for moving said plunger into engagement with said contact and compressing said resilient means, and valve means in said plunger for controlling fluid flow through said passage, said valve being adapted to restrict flow through said passage when said plunger and contact are released by said second-named means for movement by said resilient means.

3. In apparatus of the class described, a casing, a fluid in said casing, a plunger in said casing having a fluid passage therethrough, resilient means normally resisting movement of said plunger in either direction, a valve in said plunger for controlling fluid flow through said passage, resilient means for normally resisting movement of said valve in either direction, and common electro-magnetic means for actuating said plunger in said casing and for actuating said valve relative to said plunger.

4. In apparatus of the class described, a casing, fluid in said casing, a plunger in said casing with a fluid passage therethrough, a valve in said plunger for controlling the fluid flow through said passage, a connection to said plunger from a source of electric energy, electrical contacts adjacent each end of said plunger, magnetic means for moving said plunger into electrical engagement with either of said contacts, resilient means for returning said plunger to neutral position upon release by said magnetic means, the return movement thereof being controlled by the rate of fluid flow through said passage.

5. A two-way make and break switch comprising a casing, a plunger in said casing, a connection from a source of electrical energy to said plunger, contacts disposed on either side of and electrically insulated from said plunger, resilient means for holding said contacts in a predetermined position, magnetic means for moving said plunger into electrical engagement with either of said contacts and compressing the resilient means associated with the engaged contact, and other resilient means for returning said plunger to neutral position when the same is released by said magnetic means, said first-named resilient means maintaining said contact in engagement with the moving plunger for a predetermined period after release of the latter by said magnetic means.

6. A make and break switch comprising a casing, a fluid therein, a hollow plunger in said casing having a fluid passage therethrough, a connection from a source of electrical energy to said plunger, a valve in said plunger for controlling the fluid flow through said passage, electric contacts yieldingly held in a predetermined position relative to the casing by resilient means and adapted to be selectively engaged by said plunger, resilient means yieldingly opposing movement of said plunger in either direction toward said contacts, and other resilient means opposing movement of said valve in either direction.

7. In apparatus of the class described, a casing, a fluid therein, a hollow plunger in said casing having a fluid passage therethrough, a connection from a source of electrical energy to said plunger, a valve in said plunger, a pair of electric contacts, resilient means for holding said contacts in a predetermined position relative to said plunger, resilient means yieldingly opposing movement of said plunger in either direction, resilient means opposing the movement of said valve in either direction, and common electromagnetic means for moving said plunger into electrical engagement with either of said contacts to compress said first-named resilient means and for moving said valve relative to said plunger to control the flow of fluid through said passage.

8. In apparatus of the class described, a casing, resilient contacts in each end thereof, fluid in said casing, a plunger in said casing having a fluid passage therethrough, a source of electric energy electrically connected to said plunger, valve means in said plunger for controlling the flow of fluid through said passage, magnetic means for electrically engaging said plunger with either of said contacts, and resilient means for opposing the engaging movement of said plunger and for returning the same to neutral position upon release by said magnetic means, said valve means restricting said fluid passage to retard said return movement and said engaged resilient contact remaining in electric engagement with said plunger for a predetermined period.

ROY S. SANFORD.